United States Patent
Nawata et al.

(10) Patent No.: US 9,751,519 B2
(45) Date of Patent: Sep. 5, 2017

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventors: Hidekazu Nawata, Gotemba (JP); Toshio Inoue, Gotemba (JP); Keita Fukui, Fujinomiya (JP); Tomoaki Honda, Gotemba (JP); Yuta Niwa, Mishima (JP); Taichi Osawa, Susono (JP); Shunsuke Fushiki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/126,669

(22) PCT Filed: Jan. 28, 2015

(86) PCT No.: PCT/JP2015/000364
§ 371 (c)(1),
(2) Date: Sep. 16, 2016

(87) PCT Pub. No.: WO2015/141112
PCT Pub. Date: Sep. 24, 2015

(65) Prior Publication Data
US 2017/0088114 A1   Mar. 30, 2017

(30) Foreign Application Priority Data
Mar. 18, 2014   (JP) .................................. 2014-054868

(51) Int. Cl.
*B60W 20/10*   (2016.01)
*B60L 1/00*   (2006.01)
(Continued)

(52) U.S. Cl.
CPC .............. *B60W 20/10* (2013.01); *B60H 1/02* (2013.01); *B60K 6/26* (2013.01); *B60L 1/006* (2013.01);
(Continued)

(58) Field of Classification Search
None
See application file for complete search history.

(56) References Cited

U.S. PATENT DOCUMENTS 6,104,160 A * 8/2000 Iwata ..................... B60L 3/0092
307/66
7,839,020 B2 * 11/2010 Nakanishi ............... H02J 3/005
307/65

(Continued)

FOREIGN PATENT DOCUMENTS

JP   2001-231106   8/2001
JP   2013-189161   9/2013

*Primary Examiner* — Russell Frejd
(74) *Attorney, Agent, or Firm* — Finnegan, Henderson, Farabow, Garrett & Dunner, LLP

(57) ABSTRACT

A vehicle includes an engine and a battery, and is configured to perform external power feeding of supplying electric power to the outside of the vehicle. The vehicle includes an MG that generates electric power by using motive power of the engine, and an ECU that controls the engine and the MG. When an outside air temperature is below a reference temperature and an amount of remaining fuel of the engine is below a reference amount in a case where the external power feeding is to be performed, the ECU limits the driving of the engine.

6 Claims, 5 Drawing Sheets

(51) Int. Cl.
  *H02K 7/18*    (2006.01)
  *B60K 6/26*    (2007.10)
  *G01C 21/34*   (2006.01)
  *B60H 1/02*    (2006.01)
  *H02J 7/34*    (2006.01)

(52) U.S. Cl.
  CPC ............... *G01C 21/34* (2013.01); *H02J 7/34* (2013.01); *H02K 7/1815* (2013.01); *B60W 2530/00* (2013.01); *B60W 2550/12* (2013.01); *B60W 2710/06* (2013.01); *B60W 2710/30* (2013.01); *B60Y 2200/92* (2013.01); *B60Y 2400/60* (2013.01); *Y10S 903/906* (2013.01)

(56) References Cited

U.S. PATENT DOCUMENTS

| | | | | |
|---|---|---|---|---|
| 8,525,473 | B2* | 9/2013 | Shimizu | B60L 11/1816 320/109 |
| 8,860,361 | B2* | 10/2014 | Fukuzawa | B60W 10/26 320/103 |
| 2002/0047419 | A1* | 4/2002 | Shimizu | F02N 11/06 310/120 |
| 2006/0113798 | A1* | 6/2006 | Oyobe | B60K 6/26 290/7 |
| 2009/0278492 | A1* | 11/2009 | Shimizu | B60L 11/1816 320/108 |
| 2012/0136519 | A1* | 5/2012 | Suzuki | B60W 20/00 701/22 |
| 2013/0226379 | A1* | 8/2013 | Hirai | B60K 6/445 701/22 |
| 2014/0225437 | A1* | 8/2014 | Mizuno | H02J 9/06 307/23 |
| 2014/0291994 | A1* | 10/2014 | Hirasawa | B60L 11/1859 290/40 R |
| 2016/0031434 | A1* | 2/2016 | Thompson | B60W 10/02 701/22 |

* cited by examiner

HYBRID VEHICLE AND METHOD OF CONTROLLING THE SAME

CROSS-REFERENCE TO RELATED APPLICATIONS

This application is a national phase application of International Application No. PCT/JP2015/000364, filed Jan. 28, 2015, and claims the priority of Japanese Application No. 2014-054868, filed Mar. 18, 2014, the content of both of which is incorporated herein by reference.

TECHNICAL FIELD

The present invention relates to hybrid vehicles and methods of controlling the same, and more particularly to a hybrid vehicle configured to perform external power feeding of supplying electric power to the outside of the vehicle and a method of controlling the same.

BACKGROUND ART

Hybrid vehicles configured to perform external power feeding of supplying electric power to an electrical device and the like outside of the vehicle are known. Some of such hybrid vehicles can supply not only electric power stored in a vehicle-mounted battery, but also electric power generated by a power generator using motive power of an engine.

For example, a hybrid vehicle disclosed in Japanese Patent Laying-Open No. 2013-189161 (PTL 1) includes battery determination means for determining based on an SOC (State of Charge) of a battery whether or not electric power can be supplied from the battery to the outside of the vehicle, and fuel determination means for determining based on an amount of remaining fuel whether or not electric power can be supplied to the outside of the vehicle by activating a power generator with driving power of an engine. According to the hybrid vehicle disclosed in PTL 1, the electric power is not supplied when the SOC of the battery is low and the amount of remaining fuel is small. Consequently, the hybrid vehicle can be prevented from running out of fuel and being unable to run.

CITATION LIST

Patent Literature

[PTL 1] Japanese Patent Laying-Open No. 2013-189161

SUMMARY OF INVENTION

Technical Problem

Sometimes there is only a small amount of remaining fuel as a result of driving an engine for external power feeding, resulting in the vehicle running with little remaining fuel after the external power feeding has been performed. Examples of such running include travel to a fueling facility such as a gas station for refueling.

During this travel, the interior of the vehicle needs to be heated when an outside air temperature is low in winter or in cold regions and the like. In this case, if the engine cannot be warmed up due to the small amount of remaining fuel, a heating device that uses thermal energy generated during the driving of the engine cannot be used.

Some of hybrid vehicles adapted to cold regions include a heating device (such as an electric heater or a heat pump system) that uses electric energy stored in a battery. When compared with each other to consume substantially the same amounts of energy, however, a heating device that uses electric energy is lower in heating performance than a heating device that uses thermal energy from an engine and the like. When an outside air temperature is very low, therefore, sufficiently high heating performance may not be ensured unless heating can be performed using thermal energy from an engine.

The present invention has been made in order to solve the problem described above, and an object of the present invention is to provide a technique capable of ensuring heating performance after external power feeding has been performed in a hybrid vehicle configured to perform the external power feeding.

Solution to Problem

A hybrid vehicle according to one aspect of the present invention includes an internal combustion engine and a power storage device, and is configured to perform external power feeding of supplying electric power to the outside of the vehicle. The hybrid vehicle includes a power generator that generates electric power by using motive power of the internal combustion engine, and a control device that controls the internal combustion engine and the power generator. The control device limits driving of the internal combustion engine when an outside air temperature is below a reference temperature and an amount of remaining fuel of the internal combustion engine is below a reference amount in a case where the external power feeding is to be performed.

In a method of controlling a hybrid vehicle according to another aspect of the present invention, the hybrid vehicle includes a power storage device, an internal combustion engine, and a power generator that generates electric power by using motive power of the internal combustion engine, and is configured to perform external power feeding of supplying electric power to the outside of the vehicle. The control method includes the steps of detecting an outside air temperature, detecting an amount of remaining fuel of the internal combustion engine, and limiting driving of the internal combustion engine when the outside air temperature is below a reference temperature and the amount of remaining fuel is below a reference amount in a case where the external power feeding is to be performed.

Preferably, the hybrid vehicle further includes a heating device that heats an interior of the vehicle by using heat generated during the driving of the internal combustion engine. The reference amount is set such that the interior of the vehicle can be heated by the heating device after the external power feeding has been performed.

When the outside air temperature is low during running after the external power feeding has been performed, the interior of the vehicle needs to be heated. When the amount of remaining fuel of the internal combustion engine decreases due to the external power feeding, however, the internal combustion engine may not be warmed up. In this case, required heating performance may not be ensured by using the heating device that uses thermal energy generated during the driving of the internal combustion engine.

According to the configuration and method described above, when the outside air temperature is below the reference temperature and the amount of remaining fuel is below the reference amount in the case where the external power feeding is to be performed, the driving of the internal combustion engine is limited (e.g., prohibited). This means that electric power stored in the power storage device is supplied to the outside of the vehicle, and therefore, the fuel in an amount corresponding to the reference amount remains without being consumed. By using this fuel, the internal combustion engine can be driven and warmed up even after the external power feeding has been performed. Accordingly, required heating performance can be ensured by using the heating device that uses thermal energy generated during the driving of the internal combustion engine.

Preferably, the reference amount is set such that it increases with decrease in the outside air temperature. A greater amount of fuel is required to heat the interior of the vehicle with decrease in the outside air temperature. According to this configuration where the reference amount increases with decrease in the outside air temperature, the driving of the internal combustion engine is limited earlier with decrease in the outside air temperature. Accordingly, the amount of remaining fuel after the external power feeding has been performed increases with decrease in the outside air temperature. Thus, heating performance can be ensured depending on the outside air temperature. When the outside air temperature is moderately high, on the other hand, a small amount of remaining fuel is required for heating. According to this configuration where the reference amount decreases with increase in the outside air temperature, the driving of the internal combustion engine is more resistant to being limited with increase in the outside air temperature. Accordingly, an increased amount of electric power can be supplied to the outside of the vehicle at the time of execution of the external power feeding.

Preferably, the reference amount is set such that it increases with increase in travel distance from a position of the hybrid vehicle at the time of execution of the external power feeding to a fueling facility. Preferably, the hybrid vehicle further includes a car navigation system configured to calculate a travel route from a current position of the hybrid vehicle to a destination. The travel distance is calculated by means of the car navigation system.

When the amount of remaining fuel decreases due to the external power feeding, the vehicle will probably run to a nearby fueling facility (e.g., a gas station). As a travel distance to the fueling facility increases, a driving time is extended, and thus a greater amount of fuel is required for heating. According to this configuration where the reference amount increases with increase in the travel distance to the fueling facility, the driving of the internal combustion engine is limited earlier with increase in the travel distance. Accordingly, the fuel for use of the heating device during the running after the external power feeding has been performed can be secured.

Advantageous Effects of Invention

According to the present invention, heating performance after external power feeding has been performed can be ensured in a hybrid vehicle configured to perform the external power feeding.

DESCRIPTION OF EMBODIMENTS

Figure 1:
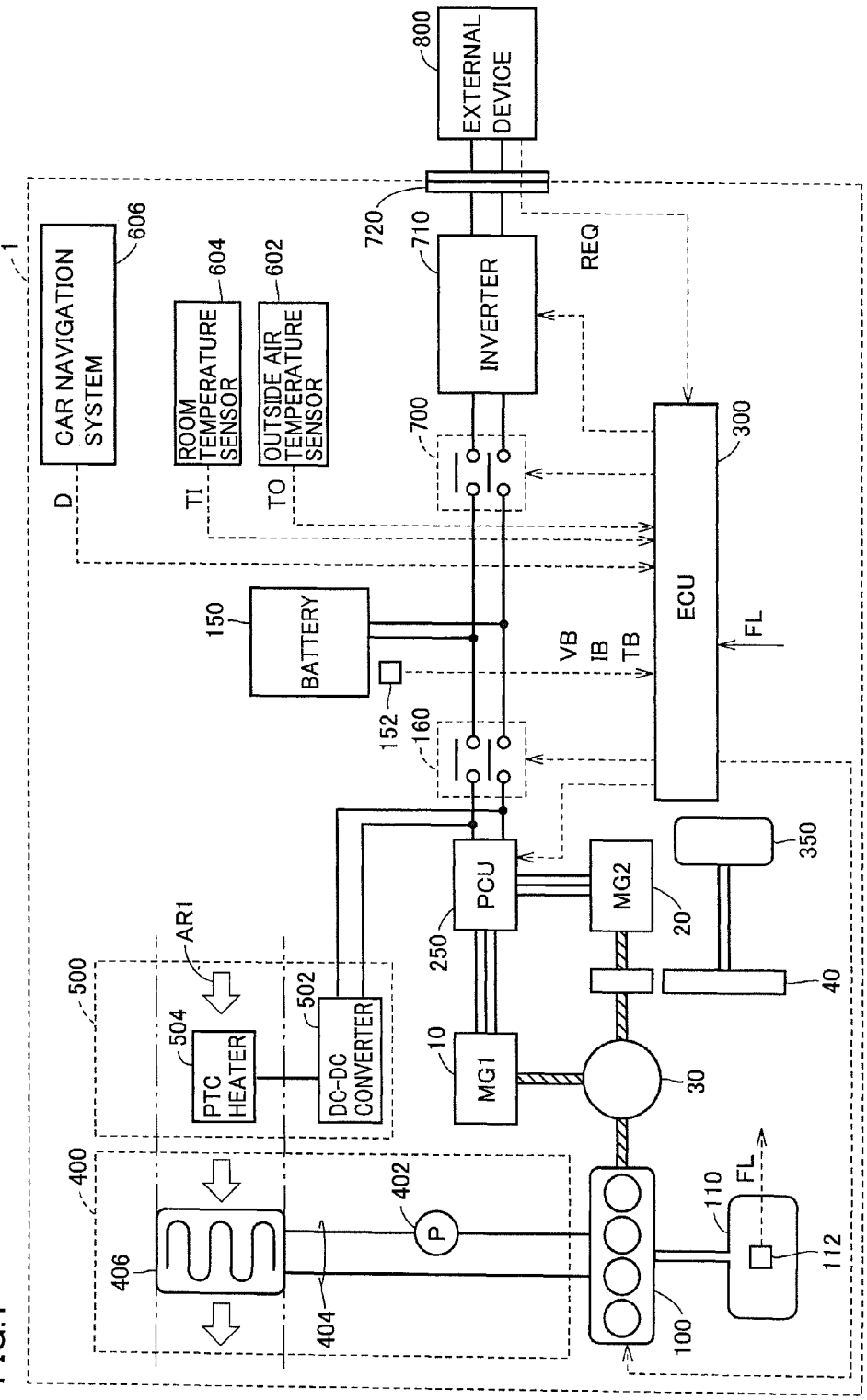
FIG. 1 is a block diagram schematically illustrating the configuration of a vehicle according to a first embodiment of the present invention.

Embodiments of the present invention will be described below in detail with reference to the drawings, in which the same or corresponding parts are designated by the same reference characters and description thereof will not be repeated.

First Embodiment

FIG. 1 is a block diagram schematically illustrating the configuration of a vehicle according to a first embodiment of the present invention. Referring to FIG. 1, a vehicle 1 is a hybrid vehicle including an engine 100, a battery 150, an MG (Motor Generator) 10, an MG 20, a power split device 30, a reduction gear 40, an SMR (System Main Relay) 160, a PCU (Power Control Unit) 250, an ECU (Electronic Control Unit) 300, and driving wheels 350.

Engine 100 is an internal combustion engine such as a gasoline engine or a diesel engine. Engine 100 outputs motive power for vehicle 1 to run based on control by ECU 300.

Engine 100 is connected to a fuel tank 110. Fuel tank 110 stores fuel of engine 100 such as gasoline, ethanol or propane gas. A fuel gauge 112 is provided within fuel tank 110. Fuel gauge 112 detects an amount of remaining fuel FL in fuel tank 110 and outputs a result of the detection to ECU 300.

Each of MG 10 and MG 20 is, for example, a three-phase alternating-current (AC) rotating electric machine including a rotor having a permanent magnet buried therein (neither shown). MG 10 causes rotation of a crankshaft (not shown) of engine 100 by using electric power of battery 150 to thereby start engine 100. MG 10 can also generate electric power by using the motive power of engine 100. AC power generated by MG 10 is converted to direct-current (DC) power by PCU 250 to charge battery 150. The AC power generated by MG 10 may be supplied to MG 20.

MG 20 generates driving power by using at least one of the electric power supplied from battery 150 and the electric power generated by MG 10. The driving power of MG 20 is transmitted to driving wheels 350. At the time of regenerative braking of the vehicle, kinetic energy of the vehicle is transmitted from driving wheels 350 to MG 20, to thereby drive MG 20. AC power generated by MG 20 is converted to DC power by PCU 250 to charge battery 150.

Power split device 30 divides the motive power generated by engine 100 into two paths of motive power. Motive power in one path is transmitted to driving wheels 350. Motive power in the other path is transmitted to MG 10. Power split device 30 is, for example, a planetary gear mechanism including a sun gear, pinion gears, a carrier, and a ring gear (none shown). Reduction gear 40 transmits the motive power from power split device 30 or MG 20 to driving wheels 350.

PCU 250 converts the DC power stored in battery 150 into AC power for supply to MG 10 and MG 20. PCU 250 also converts the AC power generated by MG 10 and MG 20 into DC power for supply to battery 150.

SMR 160 is provided on a path connecting battery 150 and PCU 250 to each other. SMR 160 switches between supply and interruption of electric power between battery 150 and PCU 250 based on control by ECU 300.

Battery 150 is a rechargeable power storage device. As battery 150, a secondary battery such as a nickel-metal hydride battery or a lithium-ion battery, or a capacitor such as an electric double layer capacitor can be employed.

Battery 150 is provided with a battery sensor 152. Battery sensor 152 collectively represents a current sensor, a voltage sensor and a temperature sensor (none shown). The voltage sensor detects a voltage VB of battery 150. The current sensor detects a current IB input to/output from battery 150. The temperature sensor detects a temperature TB of battery 150. Each sensor outputs a result of the detection to ECU 300. ECU 300 estimates an SOC of battery 150 based on voltage VB, current IB and temperature TB of battery 150.

Vehicle 1 is configured to perform external power feeding. As a configuration for the external power feeding, vehicle 1 further includes a relay 700, an inverter 710, and a power feeding socket 720.

Relay 700 is provided on a path connecting battery 150 and inverter 710 to each other. Relay 700 switches between supply and interruption of electric power between battery 150 and inverter 710 based on control by ECU 300.

At the time of execution of the external power feeding, inverter 710 is electrically connected to an electrical device outside of the vehicle (external device) 800 through power feeding socket 720, and relay 700 is closed. In response to a power feeding request signal REQ from external device 800, ECU 300 controls inverter 710 such that the DC power from battery 150 is converted into AC power for supply to external device 800.

Vehicle 1 includes two energy sources for heating the interior of the vehicle. A thermal heating device 400 heats the interior of the vehicle by using thermal energy generated during the driving of engine 100. An electric heating device 500 heats the interior of the vehicle by using electric energy stored in battery 150.

Thermal heating device 400 includes a circulation pump 402, a coolant path 404, and a heater core 406. Circulation pump 402 operates as a pump such that a coolant of engine 100 circulates through coolant path 404. When the coolant passes through heater core 406 provided on coolant path 404, heat is exchanged between heater core 406 and the coolant to thereby heat the air blown into the interior of the vehicle. A flow of air is indicated by an arrow AR1.

Electric heating device 500 includes a DC-DC converter 502 and a PTC (Positive Temperature Coefficient) heater 504. DC-DC converter 502 converts voltage VB of battery 150 into a voltage that can be used by PTC heater 504. PTC heater 504 generates heat by using electric power supplied from battery 150 to thereby heat the air blown into the interior of the vehicle. It is noted that the type of electric heating device 500 is not particularly limited as long as it generates heat by using the electric power of battery 150. For example, electric heating device 500 may be a heat pump system.

Vehicle 1 further includes an outside air temperature sensor 602, a room temperature sensor 604, and a car navigation system 606. Outside air temperature sensor 602 detects a temperature outside of vehicle 1 (outside air temperature) TO. Room temperature sensor 604 detects a temperature in the interior of the vehicle (room temperature) TI. Each sensor outputs a result of the detection to ECU 300.

Car navigation system 606 obtains a travel route from a current position of vehicle 1 to a destination. Car navigation system 606 further calculates a travel distance D of that travel route and outputs a result of the calculation to ECU 300.

ECU 300 includes a CPU (Central Processing Unit), a memory, and a buffer (none shown). ECU 300 controls the devices so as to attain a desired state of vehicle 1 based on the signals transmitted from the sensors, and a map and a program stored in the memory.

Sometimes there is only a small amount of fuel left after the external power feeding has been performed as a result of driving engine 100 for the external power feeding. In this case, the vehicle will probably travel to a fueling facility such as a gas station for refueling. During this travel, the interior of the vehicle needs to be heated when outside air temperature TO is low in winter or in cold regions and the like. If engine 100 cannot be warmed up due to small amount of remaining fuel FL, however, thermal heating device 400 cannot be used.

Generally, when compared with each other to consume substantially the same amounts of energy, an electric heating device is lower in heating performance than a thermal heating device. Thus, although vehicle 1 includes electric heating device 500, when outside air temperature TO is very low, sufficiently high heating performance may not be ensured unless thermal heating device 400 can be used.

In the first embodiment, therefore, when outside air temperature TO is lower than a reference temperature Tc and amount of remaining fuel FL is smaller than a reference amount Vc in a case where the external power feeding is to be performed, driving limitation control of limiting (prohibiting in this embodiment) the driving of engine 100 is performed. This means that the electric power stored in battery 150 is supplied to external device 800, and therefore, the fuel in an amount corresponding to reference amount Vc remains in fuel tank 110 without being consumed even after the external power feeding has been performed. By using this fuel, engine 100 can be driven and warmed up during running after the external power feeding has been performed. Accordingly, sufficiently high heating performance can be ensured by using thermal heating device 400.

Figure 2:
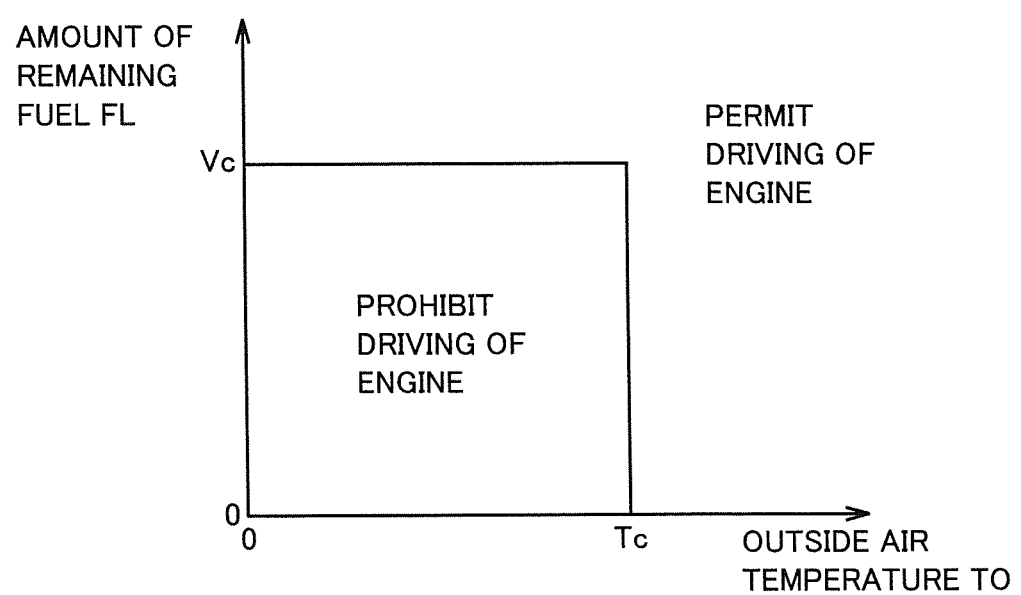
FIG. 2 is a diagram showing that the prohibition and permission of the driving of an engine is determined based on an outside air temperature and an amount of remaining fuel in the first embodiment.

FIG. 2 is a diagram showing that the prohibition and permission of the driving of engine 100 is determined based on outside air temperature TO and amount of remaining fuel FL in the first embodiment. Referring to FIG. 2, the horizontal axis represents outside air temperature TO and the vertical axis represents amount of remaining fuel FL.

When outside air temperature TO is equal to or lower than reference temperature Tc and amount of remaining fuel FL is equal to or smaller than reference amount Vc in the case where the external power feeding is to be performed, the driving of engine 100 is prohibited. This means that the electric power from battery 150 is supplied to external device 800 (hereinafter also referred to as "selecting a supply path from battery 150").

When outside air temperature TO is higher than reference temperature Tc, or when amount of remaining fuel FL is greater than reference amount Vc, on the other hand, the driving of engine 100 is permitted. Then, it is determined whether to drive or stop engine 100 depending on, for example, the SOC of battery 150. Driving engine 100 and supplying the electric power generated by MG 10 using the motive power of engine 100 to the outside of the vehicle is hereinafter also referred to as "selecting a supply path from engine 100."

Here, reference temperature Tc of outside air temperature TO is set based on the heating performance of thermal heating device 400 and electric heating device 500. Reference temperature Tc is preferably a temperature at which the interior of the vehicle can be sufficiently heated by using only thermal heating device 400. It is noted that reference temperature Tc may be set based on not only outside air temperature TO from the outside air temperature sensor, but also a combination of room temperature TI from room temperature sensor 604, a result of detection from an light sensor (not shown) that detects the brightness of the sun, and outside air temperature TO.

In addition, an appropriate range (or appropriate value) of reference amount Vc of amount of remaining fuel FL is preferably set in consideration of the following circumstances. If reference amount Vc is smaller than the appropriate range, engine 100 cannot be warmed up to a temperature at which thermal heating device 400 can deliver sufficiently high heating performance. Accordingly, reference amount Vc is preferably set such that the interior of the vehicle can be heated by thermal heating device 400 after the external power feeding has been performed.

If reference amount Vc is greater than the appropriate range, on the other hand, engine 100 is stopped early at the time of execution of the external power feeding, resulting in a reduction in the amount of electric power that can be generated by MG 10 using the motive power of engine 100. Consequently, an amount of electric power requested by external device 800 may not be supplied. Accordingly, reference amount Vc is preferably set so as to attain the greatest possible amount of electric power that can be generated by MG 10. Alternatively, without consideration of the circumstances described above, a value of amount of remaining fuel FL when a fuel gauge (not shown) indicates an E (empty) level, for example, may be employed as reference amount Vc.

Figure 3:
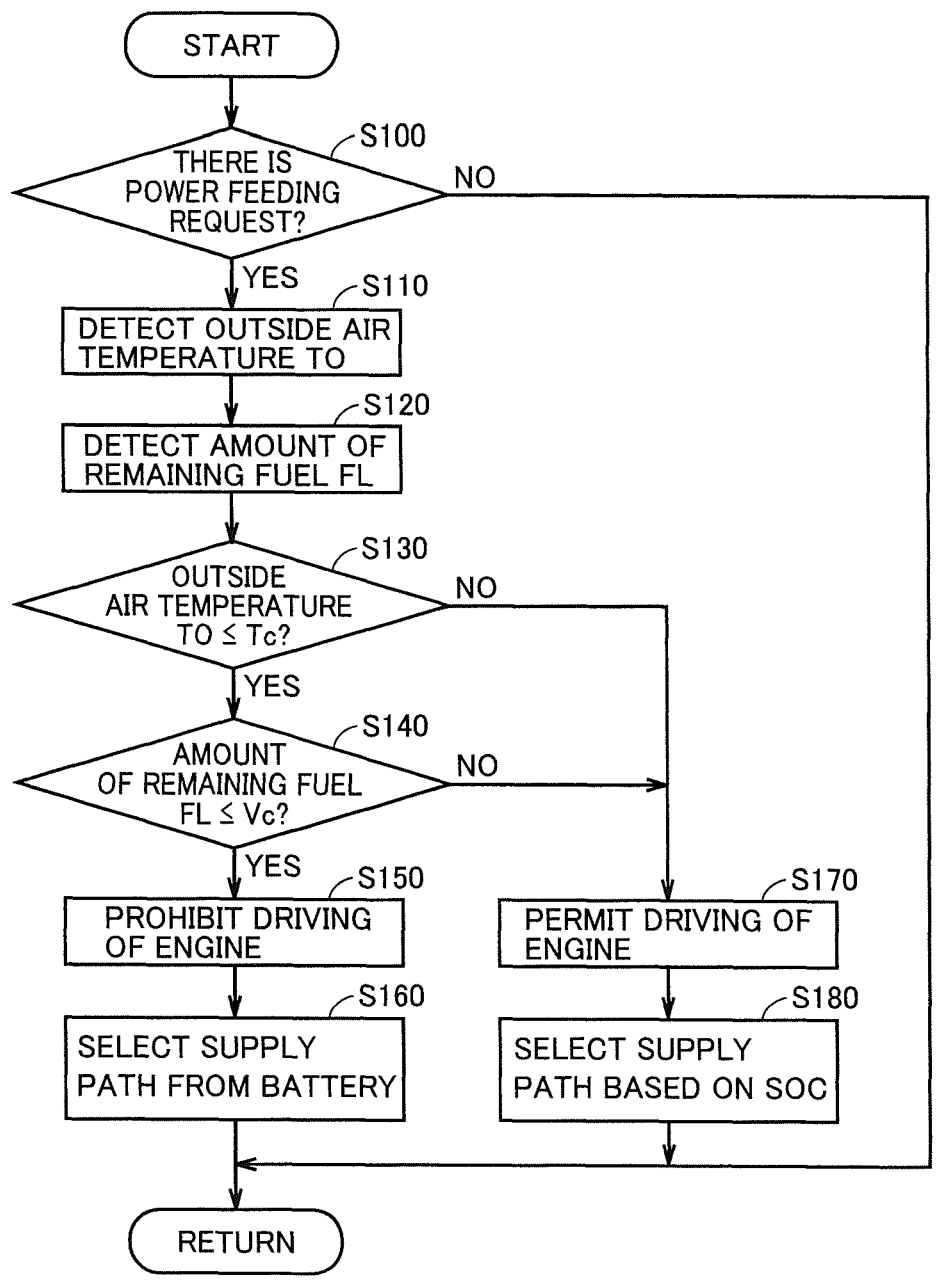
FIG. 3 is a flowchart illustrating driving limitation control of the engine in the first embodiment.

FIG. 3 is a flowchart illustrating the driving limitation control of engine 100 in the first embodiment. This flowchart is called from a main routine for execution when a prescribed condition is satisfied or at regular time intervals. While the steps of this flowchart are basically implemented through software processing by ECU 300, they may be implemented through hardware processing by an electronic circuit fabricated within ECU 300.

Referring to FIGS. 1 and 3, in step S100, ECU 300 determines whether or not external power feeding is to be performed (or whether or not external power feeding is being performed). More specifically, ECU 300 determines that external power feeding is to be performed when power feeding request signal REQ is received from external device 800. When the external power feeding is to be performed (YES in step S100), the process proceeds to step S110. When the external power feeding is not to be performed (NO in step S100), the process returns to the main routine.

In step S110, ECU 300 causes outside air temperature sensor 602 to detect outside air temperature TO. In step S120, ECU 300 causes fuel gauge 112 to detect amount of remaining fuel FL. Then, ECU 300 determines whether or not outside air temperature TO is equal to or lower than reference temperature Tc (step S130), and determines whether or not amount of remaining fuel FL is equal to or smaller than reference amount Vc (step S140).

When outside air temperature TO is equal to or lower than reference temperature Tc and amount of remaining fuel FL is equal to or smaller than reference amount Vc (YES in both steps S130 and S140), ECU 300 prohibits the driving of engine 100 (step S150). In other words, ECU 300 selects the supply path from battery 150 (step S160).

When outside air temperature TO is higher than reference temperature Tc, or when amount of remaining fuel FL is greater than reference amount Vc (NO in step S130 or NO in step S140), on the other hand, ECU 300 permits the driving of engine 100 (step S170). Then, ECU 300 selects a supply path of electric power to the outside of the vehicle based on the SOC, for example (step S180). In other words, ECU 300 selects the supply path from battery 150 when the SOC is equal to or higher than a prescribed value, and switches the supply path to the one from engine 100 when the SOC decreases and falls below the prescribed value. It is noted that the supply path from battery 150 and the supply path from engine 100 can be used in combination.

When the process in step S160 or step S180 ends, the process returns to the main routine.

In this manner, according to the first embodiment, when outside air temperature TO is below reference temperature Tc and amount of remaining fuel FL is below reference amount Vc, the driving of engine 100 for the external power feeding is prohibited. This means that the electric power stored in battery 150 is supplied to external device 800, and therefore, the fuel in an amount corresponding to reference amount Vc remains in fuel tank 110 without being consumed even after the external power feeding has been performed. By using this fuel, engine 100 can be driven and warmed up during running after the external power feeding has been performed. Accordingly, required heating performance can be ensured by using thermal heating device 400.

The first embodiment has described an example where the driving of engine 100 for the external power feeding is prohibited. However, the limitation of the driving of engine 100 is not limited to the prohibition as long as engine 100 becomes more resistant to being driven. For example, the prescribed value of the SOC used to determine whether to drive or stop engine 100 may be changed. Specifically, the prescribed value of the SOC may be set lower when outside air temperature TO is equal to or lower than reference temperature Tc and amount of remaining fuel FL is equal to or smaller than reference amount Vc (steps S150 and S160) than when outside air temperature TO is higher than reference temperature Tc or when amount of remaining fuel FL is greater than reference amount Vc (steps S170 and S180).

Although the first embodiment has described an example where vehicle 1 includes electric heating device 500, the present invention is also applicable to a vehicle without an electric heating device.

Second Embodiment

The first embodiment has described an example where reference amount Vc of amount of remaining fuel FL is constant regardless of outside air temperature TO, as shown in FIG. 2. A second embodiment describes an example where reference amount Vc is variably set depending on various conditions. It is noted that the configuration of a vehicle according to the second embodiment is the same as that of vehicle 1 shown in FIG. 1, and thus detailed description thereof will not be repeated.

Figure 4:
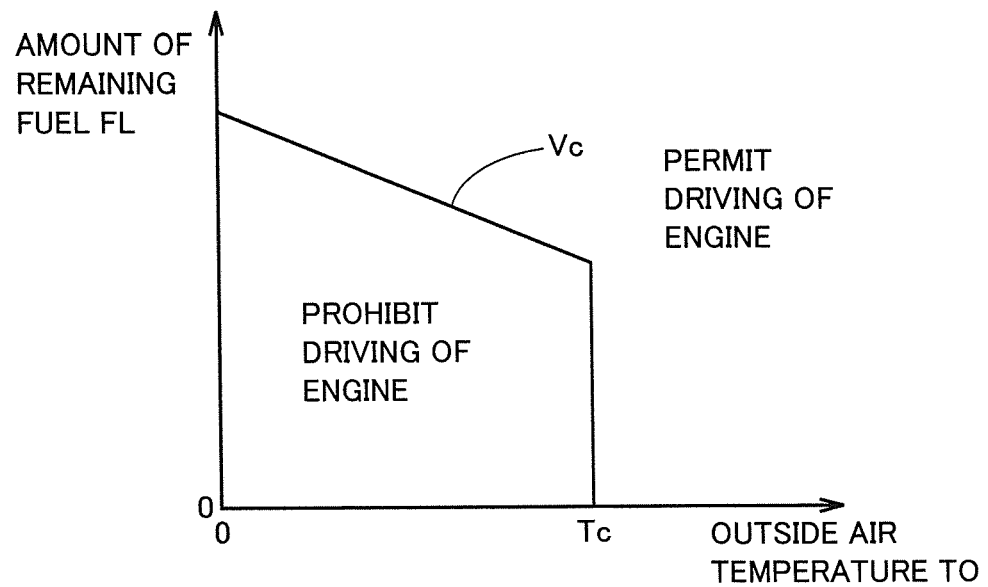
FIG. 4 is a diagram illustrating how to set a reference amount of an amount of remaining fuel depending on outside air temperature.

FIG. 4 is a diagram illustrating how to set reference amount Vc of amount of remaining fuel FL depending on outside air temperature TO. A greater amount of fuel is required to heat the interior of the vehicle with decrease in outside air temperature TO. Thus, when comparing FIGS. 4 and 2, reference amount Vc in FIG. 4 is set such that it increases with decrease in outside air temperature TO. Although FIG. 4 shows reference amount Vc increasing linearly with decrease in outside air temperature TO, this manner of increase is not particularly limited, and reference amount Vc may increase in a curved or step-like manner.

In addition, as described above, when there is only a small amount of remaining fuel FL due to the external power feeding, the vehicle will probably travel to a fueling facility for refueling after the external power feeding has been performed. A greater amount of fuel is required with increase in travel distance D from a position of vehicle 1 at the time of execution of the external power feeding to the fueling facility. Reference amount Vc of amount of remaining fuel FL is thus preferably set depending on travel distance D.

Figure 5:
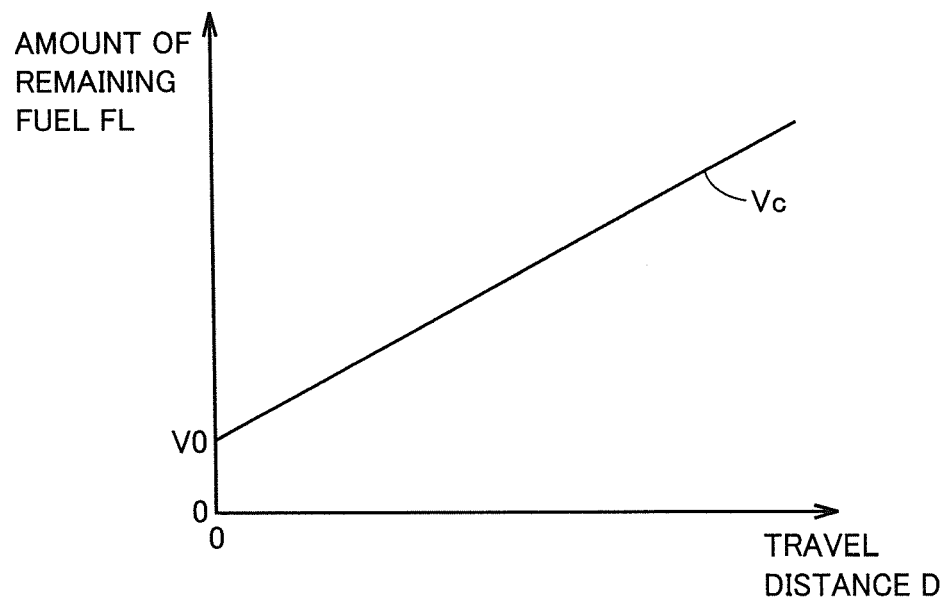
FIG. 5 is a diagram illustrating how to set the reference amount of the amount of remaining fuel depending on travel distance.

FIG. 5 is a diagram illustrating how to set reference amount Vc of amount of remaining fuel FL depending on travel distance D. Referring to FIG. 5, the horizontal axis represents travel distance D and the vertical axis represents amount of remaining fuel FL.

When travel distance D is small, that is, when the fueling facility is close to the position where the external power feeding is performed, thermal heating device 400 is operated for a short period of time, thus requiring small amount of remaining fuel FL. As travel distance D increases, that is, as the distance from the position where the external power feeding is performed to the fueling facility increases, thermal heating device 400 is operated for a longer period of time, thus requiring greater amount of remaining fuel FL to be secured. Accordingly, reference amount Vc is preferably increased with increase in travel distance D, as shown in FIG. 5.

Although FIG. 5 shows reference amount Vc increasing linearly with increase in travel distance D, reference amount Vc may increase in a curved or step-like manner. An amount of remaining fuel V0 when travel distance D is zero may be zero or a certain amount (other than zero).

In this manner, reference amount Vc of amount of remaining fuel FL is preferably set based on outside air temperature TO and travel distance D. In the second embodiment, relation among outside air temperature TO, travel distance D and reference amount Vc is stored in advance as a map or function, for example, in the memory (not shown) of ECU 300.

Figure 6:
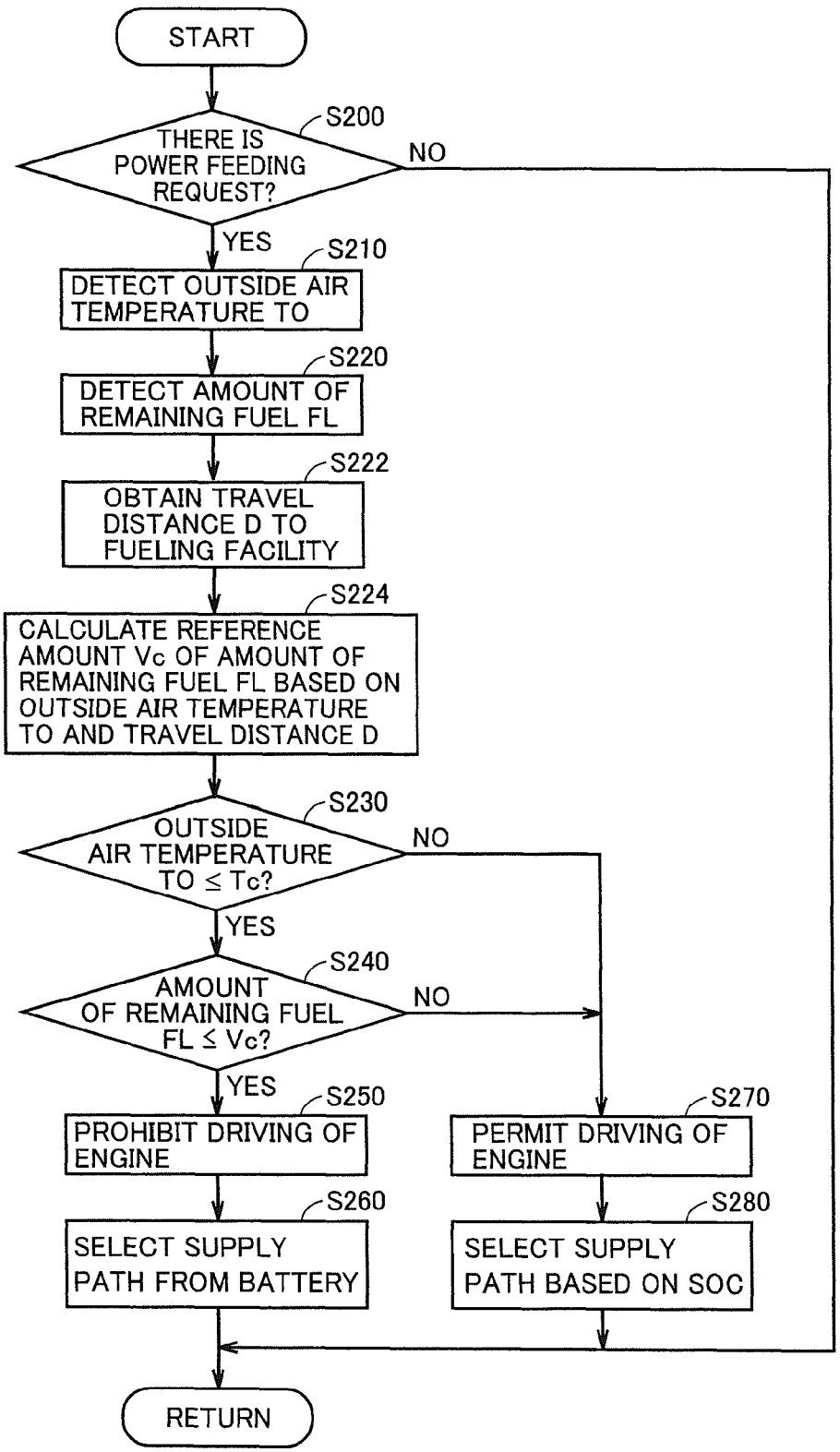
FIG. 6 is a flowchart illustrating driving limitation control of the engine in a second embodiment.

FIG. 6 is a flowchart illustrating driving limitation control of engine 100 in the second embodiment. Referring to FIG. 6, the processes from steps S200 through S220 are the same as the processes from steps S100 through S120 shown in FIG. 3, respectively, and thus detailed description thereof will not be repeated.

In step S222, ECU 300 causes car navigation system 606 to obtain travel distance D from the position of vehicle 1 to a nearby (e.g., nearest) fueling facility.

In step S224, ECU 300 calculates reference amount Vc based on outside air temperature TO and travel distance D in accordance with the map indicating the relation among outside air temperature TO, travel distance D and reference amount Vc. The subsequent processes from steps S230 through S280 are the same as the processes from steps S130 through S180 shown in FIG. 3, respectively, and thus detailed description thereof will not be repeated.

In this manner, a greater amount of fuel is required to heat the interior of the vehicle with decrease in outside air temperature TO. According to the second embodiment, the driving of engine 100 is prohibited early because reference amount Vc increases with decrease in outside air temperature TO as shown in FIG. 4. Accordingly, the fuel for use of thermal heating device 400 can be secured during running after the external power feeding has been performed.

Moreover, according to the second embodiment, the driving of engine 100 is prohibited early because reference amount Vc increases with increase in travel distance D to the fueling facility. Accordingly, the fuel for use of thermal heating device 400 can be secured during running to the nearby fueling facility after the external power feeding has been performed.

Although the second embodiment has described an example where reference amount

Vc of amount of remaining fuel FL is calculated based on both outside air temperature TO and travel distance D (see step S224), reference amount Vc may be calculated based on only one of them.

Lastly, the embodiments will be summarized with reference to FIG. 1 again. Vehicle 1 includes engine 100 and battery 150, and is configured to perform external power feeding of supplying electric power to the outside of the vehicle. Vehicle 1 includes MG 10 that generates electric power by using the motive power of engine 100, and ECU 300 that controls engine 100 and MG 10. When outside air temperature TO is below reference temperature Tc and amount of remaining fuel FL of engine 100 is below reference amount Vc in a case where the external power feeding is to be performed, ECU 300 limits the driving of engine 100.

Preferably, vehicle 1 further includes thermal heating device 400 that heats the interior of the vehicle by using heat generated during the driving of engine 100. Reference amount Vc of amount of remaining fuel FL is set such that the interior of the vehicle can be heated by thermal heating device 400 after the external power feeding has been performed.

Preferably, reference amount Vc of amount of remaining fuel FL is set such that it increases with decrease in outside air temperature TO, as shown in FIG. 4.

Preferably, reference amount Vc of amount of remaining fuel FL is set such that it increases with increase in travel distance D from a position of vehicle 1 at the time of execution of the external power feeding to the fueling facility, as shown in FIG. 5. Preferably, vehicle 1 further includes car navigation system 606 capable of calculating a travel route from a current position of vehicle 1 to a destination. Travel distance D is calculated by means of car navigation system 606.

In a method of controlling vehicle 1, vehicle 1 includes battery 150, engine 100, and MG 10 that generates electric power by using motive power of engine 100, and is configured to perform external power feeding of supplying electric power to the outside of the vehicle. The control method includes steps S110 and S210 of detecting outside air temperature TO, steps S120 and S220 of detecting amount of remaining fuel FL of engine 100, and steps S150 and S250 of prohibiting driving of engine 100 when outside air temperature TO is below reference temperature Tc and amount of remaining fuel FL is below reference amount Vc in a case where the external power feeding is to be performed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10, 20 MG; 30 power split device; 40 reduction gear; 100 engine; 110 fuel tank; 112 fuel gauge; 150 battery; 152 battery sensor; 160 SMR; 250 PCU; 300 ECU; 350 driving wheel; 400, 500 heating device; 402 circulation pump; 404 coolant path; 406 heater core; 502 DC-DC converter; 504 PTC heater; 602 outside air temperature sensor; 604 room temperature sensor; 606 car navigation system; 700 relay; 710 inverter; 720 power feeding socket; 800 external device.

The invention claimed is:

1. A hybrid vehicle including an internal combustion engine and a power storage device, and being configured to perform external power feeding of supplying electric power to the outside of the vehicle, said hybrid vehicle comprising: a power generator that generates electric power by using motive power of said internal combustion engine; and
　a control device that controls said internal combustion engine and said power generator,
　said control device limiting driving of said internal combustion engine when an outside air temperature is below a reference temperature and an amount of remaining fuel of said internal combustion engine is below a reference amount in a case where said external power feeding is to be performed.

2. The hybrid vehicle according to claim 1, further comprising a heating device that heats an interior of the vehicle by using heat generated during the driving of said internal combustion engine, wherein said reference amount is set such that said interior of the vehicle can be heated by said heating device after said external power feeding has been performed.

3. The hybrid vehicle according to claim 1, wherein said reference amount is set such that said reference amount increases with decrease in said outside air temperature.

4. The hybrid vehicle according to claim 1, wherein said reference amount is set such that said reference amount increases with increase in travel distance from a position of said hybrid vehicle at the time of execution of said external power feeding to a fueling facility.

5. The hybrid vehicle according to claim 4, further comprising a car navigation system configured to calculate a travel route from a current position of said hybrid vehicle to a destination, wherein
　said travel distance is calculated by means of said car navigation system.

6. A method of controlling a hybrid vehicle, said hybrid vehicle including a power storage device, an internal combustion engine, and a power generator, said power generator generating electric power by using motive power of said internal combustion engine, said hybrid vehicle being configured to perform external power feeding of supplying electric power to the outside of the vehicle, said method comprising the steps of:
　detecting an outside air temperature;
　detecting an amount of remaining fuel of said internal combustion engine; and
　limiting driving of said internal combustion engine when said outside air temperature is below a reference temperature and said amount of remaining fuel is below a reference amount in a case where said external power feeding is to be performed.

* * * * *